(12) United States Patent
Gatter et al.

(10) Patent No.: US 9,927,951 B2
(45) Date of Patent: Mar. 27, 2018

(54) METHOD AND SYSTEM FOR CLUSTERING ICONS ON A MAP

(71) Applicant: SAP SE, Walldorf (DE)

(72) Inventors: Juergen Gatter, Rauenberg (DE); Dimitar Vangelovski, Heidelberg (DE); Uwe Reimitz, Wiesloch (DE); Ralf Rath, Viernheim (DE); Ulrich Roegelein, Gaiberg (DE); Martina Gozlinski, Frankenthal (DE); Sangeeta Bhandari, Rauenberg (DE); Wolfgang Mueller, Wiesloch (DE); Siegfried Peisl, Ketsch (DE)

(73) Assignee: SAP SE, Walldorf (DE)

( * ) Notice: Subject to any disclaimer, the term of this patent is extended or adjusted under 35 U.S.C. 154(b) by 266 days.

(21) Appl. No.: 14/976,856

(22) Filed: Dec. 21, 2015

(65) Prior Publication Data
US 2017/0177192 A1 Jun. 22, 2017

(51) Int. Cl.
*G06F 3/0481* (2013.01)
*G06F 17/30* (2006.01)
*G06F 3/0482* (2013.01)

(52) U.S. Cl.
CPC ........ *G06F 3/04817* (2013.01); *G06F 3/0481* (2013.01); *G06F 3/0482* (2013.01); *G06F 17/3087* (2013.01); *G06F 17/30241* (2013.01); *G06F 17/30327* (2013.01); *G06F 17/30598* (2013.01)

(58) Field of Classification Search
CPC .. G06F 3/0482; G06F 3/0481; G06F 3/04842; G06F 3/04817; G06F 3/0488; G06F 3/04847; G06F 3/04845; G06F 17/30598; G06F 17/30327; G06F 17/3087; G06F 17/30241; G06F 2203/04806
See application file for complete search history.

(56) References Cited

U.S. PATENT DOCUMENTS

| | | | | |
|---|---|---|---|---|
| 6,031,548 A | * | 2/2000 | Gueziec | G06T 17/20 345/440 |
| 7,076,741 B2 | * | 7/2006 | Miyaki | G01C 21/3664 715/712 |
| 9,104,293 B1 | * | 8/2015 | Kornfeld | G06F 3/04817 |
| 2002/0018066 A1 | * | 2/2002 | Vizer | G06T 17/20 345/428 |
| 2003/0229441 A1 | * | 12/2003 | Pechatnikov | G01C 21/26 701/411 |

(Continued)

*Primary Examiner* — Tuyetlien T Tran
(74) *Attorney, Agent, or Firm* — Jones Day

(57) ABSTRACT

A set of locational information items are provided, each of which includes a set of coordinate values. These locational information items can be represented on a map including various levels of detail. A mapping application is provided which is intended to display these locational information items on various levels of detail of the map. The locational information items are clustered on certain levels of detail of the map. To cluster the locational information items, a level of detail for each LOD can be specified; a Delaunay Triangulation can be created over the set of the locational information items provided; a list of the edges associated with the Delaunay Triangulation can be generated and sorted by length; a cluster tree can be built; and the locational information items are displayed in clusters at each LOD.

15 Claims, 14 Drawing Sheets

(56) References Cited

U.S. PATENT DOCUMENTS

| | | | | |
|---|---|---|---|---|
| 2004/0090472 | A1* | 5/2004 | Risch | G06F 17/30716 715/853 |
| 2007/0211151 | A1* | 9/2007 | Baiping | G06F 17/30244 348/231.2 |
| 2008/0104530 | A1* | 5/2008 | Santanche | G06Q 90/00 715/764 |
| 2009/0100363 | A1* | 4/2009 | Pegg | G01C 21/3682 715/765 |
| 2009/0110302 | A1* | 4/2009 | Snow | G06T 11/206 382/225 |
| 2009/0113350 | A1* | 4/2009 | Hibino | G06F 17/3002 715/853 |
| 2009/0132511 | A1* | 5/2009 | Yang | G06F 17/3087 |
| 2009/0287546 | A1* | 11/2009 | Gillespie | G06F 17/30241 705/5 |
| 2011/0010650 | A1* | 1/2011 | Hess | G06F 3/04817 715/765 |
| 2011/0265030 | A1* | 10/2011 | Lin | G09B 29/007 715/790 |
| 2011/0280453 | A1* | 11/2011 | Chen | G06T 7/75 382/113 |
| 2012/0290950 | A1* | 11/2012 | Rapaport | H04L 51/32 715/753 |
| 2013/0249812 | A1* | 9/2013 | Ramos | G06F 3/0481 345/173 |
| 2014/0052763 | A1* | 2/2014 | Sato | G06F 3/0488 707/805 |
| 2014/0089036 | A1* | 3/2014 | Chidlovskii | G06Q 10/06 705/7.27 |
| 2014/0267262 | A1* | 9/2014 | Masry | G06T 17/20 345/423 |
| 2015/0169139 | A1* | 6/2015 | Leva | G06F 3/0481 701/455 |
| 2016/0048556 | A1* | 2/2016 | Kelly | G06F 17/30867 707/767 |

* cited by examiner

METHOD AND SYSTEM FOR CLUSTERING ICONS ON A MAP

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

BACKGROUND

With the advent of mapping applications on personal computing devices, structured presentation of information on maps is crucial. In response to a search command by a user, some mapping applications can find multiple locations responsive to, e.g., satisfying criteria of, the user's search query and point out all of the locations simultaneously on a map. Generally, each one of such locations is presented as a locational information item on the map, which can be a marker, an icon, an image, etc.

DETAILED DESCRIPTION

Maps presented on mapping applications can have various levels of detail levels ("LODs"). A LOD or zoom level in this context refers to the scale of the map presented on a display of a personal computing device. There can be various LODs for a given map in a mapping application. In an example embodiment, LODs can range between 0 and 22, in which LOD 0 can be the lowest LOD used and LOD 22 can be the highest LOD used. LOD 0 is a representation of a map with the least details and most scope, and LOD 22 corresponds to the view with the most detail and least scope. By zooming in, the application can provide more details per unit of area and hence, the LOD increases. For example, LOD zero of a particular map can display the world, and, at LOD 22, a user can distinguish distances of a few feet.

In an example embodiment, the relationship between various LODs can be described as follows. An aerial distance between two locations A and B can be represented by a distance x on LOD n of a map of a mapping application. The same aerial distance can be represented by a distance equal to 2x on LOD (n+1) of the map. Therefore, a given display area on a display of a computing device displaying LOD n of the map corresponds to a region four times larger than the region corresponding to the same display area on LOD (n+1) of the map.

Quick and simultaneous switching between various LODs of a map provides the user with a powerful tool to study and utilize the map. Specifically, in an example embodiment, a mapping application provides various LODs of a map, the ability to highlight identical locations on each LOD of the map, and the ability to switch between various LODs of the map while the same locations are highlighted on each LOD of the map. The mapping application is able to autonomously decide how much information to represent at each LOD and how to organize the information for which a user is asking.

Figure 1:
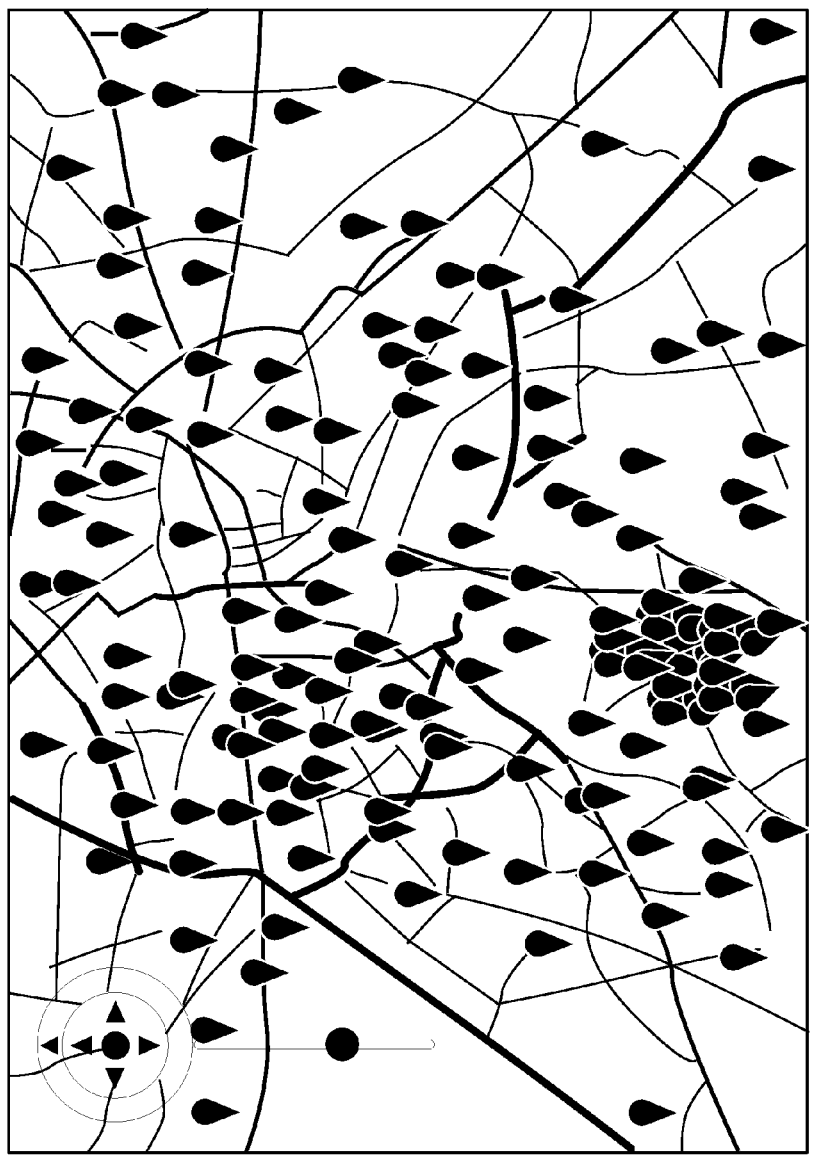
FIG. 1 illustrates an example map, in a mapping application, utilizing icons to identify various locations.

FIG. 1 illustrates an example map, in a mapping application, utilizing icons to identify various locations. In response to a search command by a user addressed to the mapping application to search and display dining facilities within a town, the mapping application can display icons, each of which represents a dining facility within the town. However, as is evident in the map of FIG. 1, there is a dense concentration of icons (i.e., locational information items) and the map is crowded. It can occur that too many locational information items overlap each other and inhibit the user from locating each one of them on the map. As a result, a user can be confused and overwhelmed by the extent of the information presented to the user.

One way to overcome problems associated with overcrowding of locational information items is by clustering locational information items. Specifically, the mapping application can cluster the locational information items into a few clusters, each cluster representing multiple locational information items.

Figure 2:
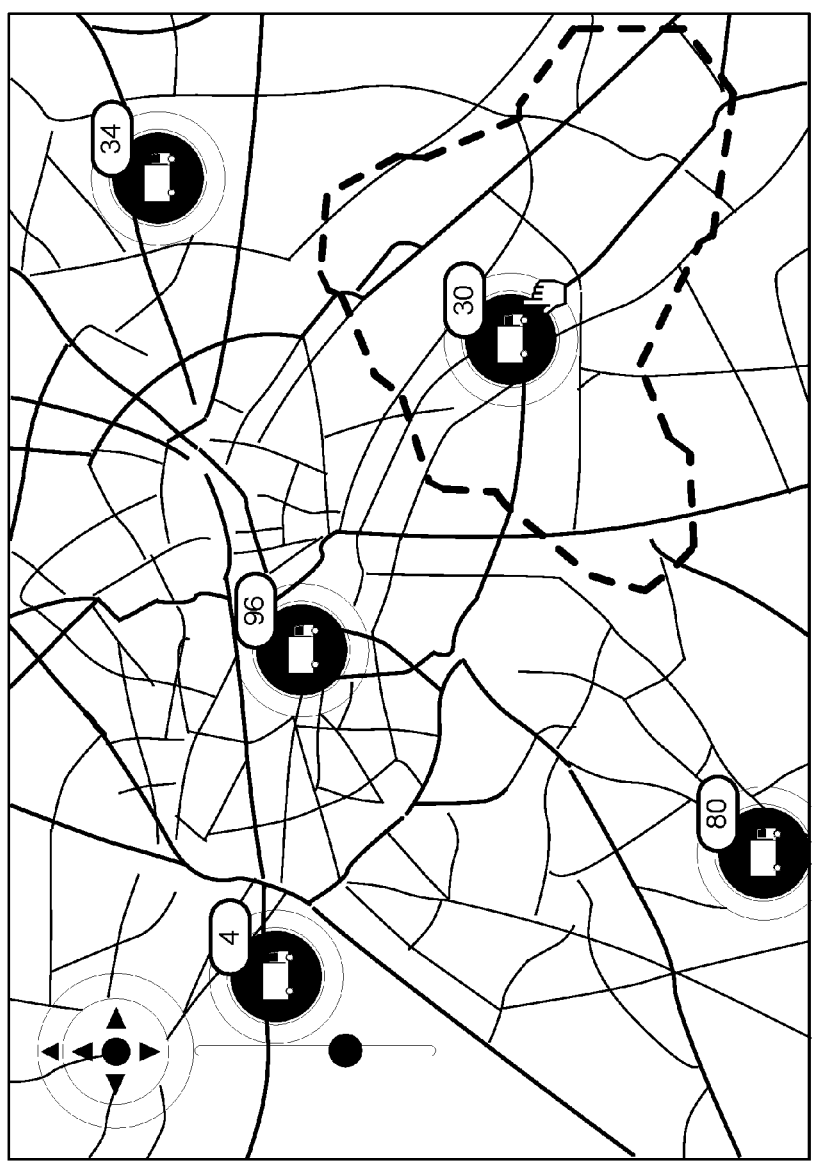
FIG. 2 illustrates an example map on which various locational information items are clustered, according to an example embodiment of the present disclosure.

FIG. 2 illustrates an example map on which various locational information items are clustered. Specifically, in this example embodiment, there are five clusters that each includes several locational information items. For example, there is a cluster which includes 30 locational information items. The five clusters can organize the information included in the map of FIG. 1. Thus, it would be easier for the user to understand an overview of the information returned in response to the user's query.

Various clustering approaches can be used. In some techniques, clustering is done for each LOD of a map independent of clustering in other LODs. As a result, two separate locational information items that belong to the same cluster in an LOD may not necessarily belong to the same cluster in a lower LOD. Other techniques use the convex hull around the locational information items included in each cluster as the area corresponding to the cluster. Such designation of cluster area to a cluster results in overlapping clusters which can diminish the user experience. The clustering method, device, and software described herein remedy such issues.

In an example embodiment, it is assumed that a set of locational information items are provided, each of which includes a set of coordinate values and optionally other information items, e.g. a title, a category, etc. These locational information items can be represented on a map including various levels of detail. A mapping application is provided which is intended to display these locational information items on various levels of detail of the map. In order to determine which locational information items are displayed separately, and which locational information items are displayed as clusters at each level of detail, in an example embodiment, the following steps are performed: the level of detail for each LOD is specified; a Delaunay Triangulation is created over a provided set of locational information items; a list of the edges associated with the Delaunay Triangulation is generated and sorted by length; a cluster tree is built; and the locational information items are displayed in clusters at each LOD.

In an example embodiment, the level of detail specification for each LOD includes a longest permissible distance ("LPD") for the LOD. On a given LOD, items that are closer to other items than the LPD are clustered into clusters with one or more other items, so long as the clustering does not result in a cluster that, overall, encompass items over an area larger than LPD. Additionally, at each LOD, except the one with greatest level of detail, clustering is performed only for pairs of informational items that are greater than a shortest permissible distance ("SPD") because these items would have already been clustered in one of the higher LODs. If it occurs that clustering of an informational item into a cluster results in the overall cluster to be larger than the LPD of the level, then the length 'd' is calculated according to the overall cluster length, so that the clustering would not be performed at the current LOD, but rather would be performed at the next lower LOD at which the length 'd' is less satisfies the LPD requirement of the respective LOD. The table below (the "LOD Table") represents various permissible distances for each LOD (from highest (6) to lowest (1)) of an example map in which a unit of distance on the display of the map of each lower LOD corresponds to a distance twice that of the next higher LOD:

| LOD | SPD | Length | LPD |
|---|---|---|---|
| 6 |  | d ≤ | 5 |
| 5 | 5 | < d ≤ | 10 |
| 4 | 10 | < d ≤ | 20 |
| 3 | 20 | < d ≤ | 40 |
| 2 | 40 | < d ≤ | 80 |
| 1 | 80 | < d ≤ | 160 |

In an example embodiment, the system determines whether any locational information items refer to an identical location. Locational information items assigned to the same location can be identified by comparing the coordinate values of all locational information items. If there are locational information items with identical coordinate values, all but one of the identical items will be excluded for the purpose of creating a Delaunay Triangulation. More details will follow on the treatment of identical locational information items.

In an example embodiment, using any of various conventional techniques for creating a Delaunay Triangulation, a Delaunay Triangulation is then created over the set of the locational information items to be considered. In general, a Delaunay Triangulation of a set of points results in a triangular mesh, which does not include any skinny triangles (i.e., the triangles are well shaped). Moreover, although Delaunay Triangulation is referenced with respect to the described embodiments, Delaunay Triangulation is only one of many forms of triangulation which can be utilized for the clustering of locational information items on various LODs.

A product of Delaunay Triangulation over a set of points is a set of connections between the points. These connections are called edges. Each edge has two vertexes (or locational information items) between which the edge is drawn. There is also a length associated with each edge. In an example embodiment, the length of an edge can be calculated using the coordinate values provided for the vertexes associated with the edge. For example, for two vertexes having coordinate values $(x_1,y_1)$ and $(x_2,y_2)$, the length of an edge connecting the two vertexes can be calculated as $\sqrt{|x_1-x_2|^2+|y_1-y|^2}$.

Figure 3:
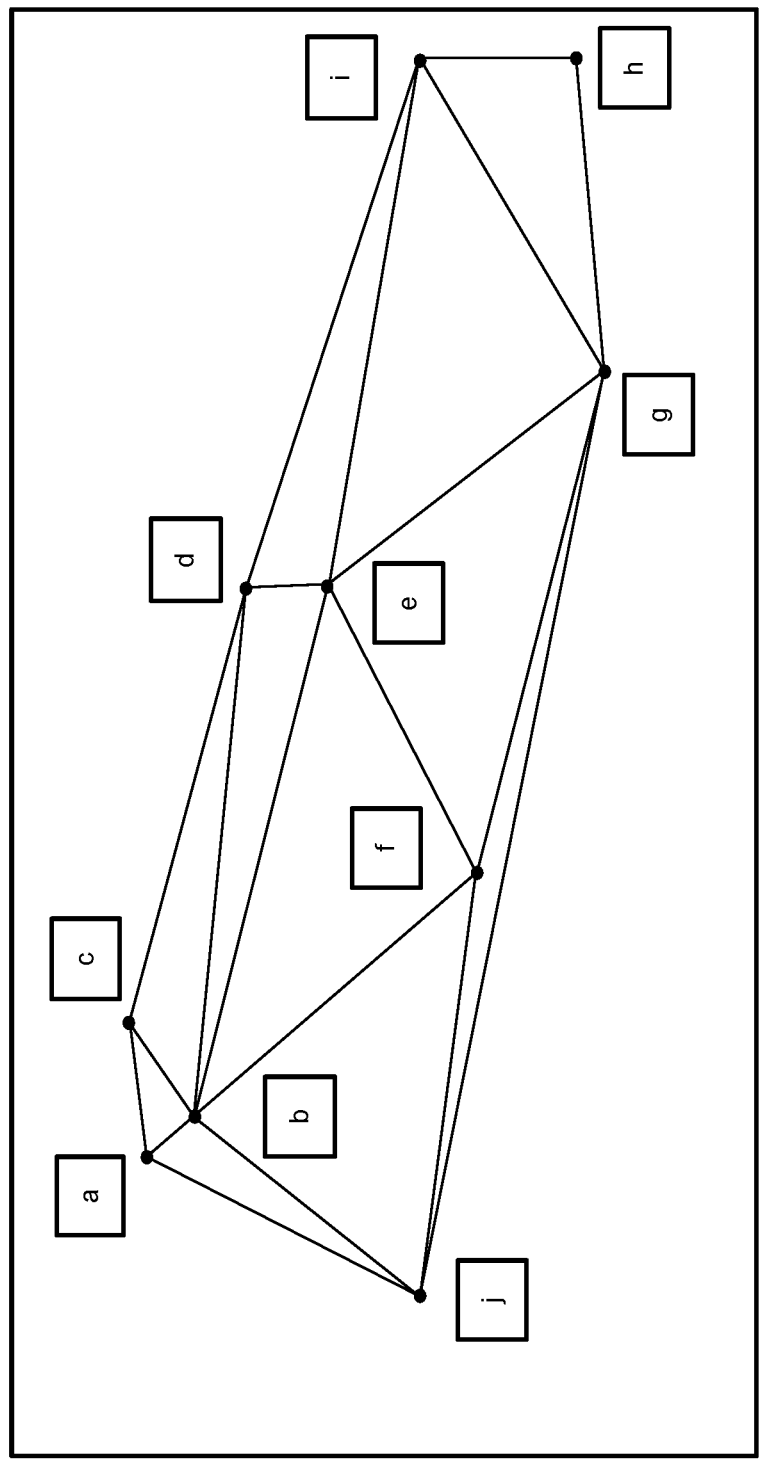
FIG. 3 shows a set of locational information items which are triangulated according to Delaunay Triangulation, according to an example embodiment of the present disclosure.

FIG. 3 shows an example embodiment of a set of locational information items which are triangulated according to Delaunay Triangulation. In FIG. 3, the locational information items are vertexes a, b, c, d, e, f, g, h, i, and j. As a result of creation of the Delaunay Triangulation, several edges have been drawn. For example, edge ab is drawn between locational information items a and b (i.e., vertexes a and b). Similarly, edge ac is drawn between locational information items a and c.

Once the Delaunay Triangulation is created over the set of locational information items, a list of the associated edges can be generated. In the next step, the edges are sorted by length, for example from shortest to longest.

The table below ("the Edge Table") is an example embodiment of a sorted edge list according to the locational information items shown in FIG. 3. In the Edge Table, there are five columns labeled as: Row, $V_1$, $V_2$, Edge, and d. The first column, Row, is an index number for each edge. The second and third columns identify the vertexes associated with each edge. The fourth column names the edge. The last column indicates the length of the edge. Here, on the first row, edge ab is identified as the shortest edge and as being drawn between locational information items a and b. Similarly, edge ac, which has a length of 17, is identified on row 4. Overall, the Delaunay Triangulation of the items of FIG. 3 resulted in twenty edges described in the Edge Table below.

| Row | $V_1$ | $V_2$ | Edge | d |
|---|---|---|---|---|
| 1 | a | b | ab | 8 |
| 2 | d | e | de | 11 |
| 3 | b | c | bc | 14 |
| 4 | a | c | ac | 17 |
| 5 | h | i | hi | 20 |
| 6 | b | j | bj | 36 |
| 7 | a | j | aj | 39 |
| 8 | g | h | gh | 40 |
| 9 | e | f | ef | 41 |
| 10 | e | g | eg | 44 |
| 11 | g | i | gi | 45 |
| 12 | b | f | bf | 47 |
| 13 | f | j | fj | 53 |
| 14 | c | d | cd | 58 |
| 15 | f | g | fg | 65 |
| 16 | e | i | ei | 66 |
| 17 | d | i | di | 66 |
| 18 | b | d | bd | 67 |
| 19 | b | e | be | 68 |
| 20 | g | j | gj | 116 |

After sorting the edges by length created by the Delaunay Triangulation, a cluster tree can be built. A cluster tree is a visual representation of clusters of various locational information items for each LOD. Building a cluster tree includes building clusters for each LOD, which involves the following. First, for each edge having a length shorter than or equal to the LPD for a given LOD (i.e., the current LOD), adding a first vertex of the edge to a cluster (at the current LOD) including a second vertex of the edge (or adding both vertexes to a new cluster (at the current LOD) when none is included in another cluster). If the first and second vertexes were already included in respective clusters, those respective clusters can be combined. Each time a first vertex (or cluster) is added to a cluster including the second vertex, the first vertex (or cluster) is initially added to whichever of the one or more clusters including the second vertex was generated at the lowest of the LODs at which any of the one or more clusters had been generated. Backtracking, described below, can then be used to change the clustering to whichever of the one more clusters including the second vertex was generated at the highest of the LODs at which any of the one or more clusters had been generated, with the clustering not causing exceedance of the LPD of the LOD at which that previously generated cluster was generated.

Each time a first vertex (or cluster) is clustered, the system checks whether the size of the constructed cluster exceeds the LPD for the current LOD. If the size of the constructed cluster is larger than the LPD for the current LOD, a new cluster can be created at the next lower LOD where the size of the new cluster would not exceed the LPD for the respective LOD. If the first vertex is added to an already existing cluster and the size of the constructed cluster is not larger than the LPD for the current LOD, the first vertex is then also backtracked. Backtracking is determining whether the first vertex (or cluster including the first vertex) can be placed at another cluster over the already existing cluster (i.e., at an LOD higher than the LOD for the already existing cluster), the other cluster including the second vertex. As before, the size of the other cluster cannot exceed the LDP for the LOD at which the cluster to which it is being added was initially generated. If the first vertex can be placed at the other cluster, the first vertex is moved to the other cluster. Building a cluster tree is complete when all of the edges have been reviewed. (Since, at each LOD, the edges are sorted by length, and review is from shortest to longest edge, it can occur that an edge which is short enough to be added to a cluster at the LOD is nevertheless not added due to a shorter edge having already not been clustered due to the inclusion of the shorter edge causing the cluster to which it would have been added to exceed the LPD of the considered LOD. This is why backtracking is performed at the lower LODs.)

There can be differing definitions for the size of a cluster. In an example embodiment, the size is defined as the maximum distance between any two vertexes included in the cluster. In another example embodiment, the diagonal of a bounding box including the vertexes in the cluster can define the size of the cluster. Bounding box in this context can be understood to be the minimum sized box that can enclose the set of vertexes. The minimum sized box can be obtained by finding the minimum and maximum coordinate values of the vertexes in the cluster and finding the length of the edge between a point at the highest of the 'x' and 'y' coordinates of the vertexes and a point at the lowest of the 'x' and 'y' coordinates of the vertexes. Utilizing a bounding box, though slightly less accurate, is cost efficient and can expedite the process of finding the size of a cluster.

Figure 4:
FIG. 4 shows a partially constructed cluster tree at a highest LOD, prior to formation of any cluster, according to an example embodiment of the present disclosure.

FIG. 4 shows an example embodiment of a partially constructed cluster tree at LOD 6, in which the informational items are not yet clustered. This cluster tree is drawn based on the locational information items shown in FIG. 3, the LOD Table and the Edge Table, all of which are only examples for the clustering, according to an example embodiment of the present disclosure. In an example embodiment, at LOD 6 of the LOD Table, edges shorter than or equal to 5 are clustered as long as the clustering does not result in a cluster spanning a length greater than 5. In the Edge Table, there are no edges equal to or shorter than 5. Therefore, no clustering takes place at LOD 6.

Figure 5:
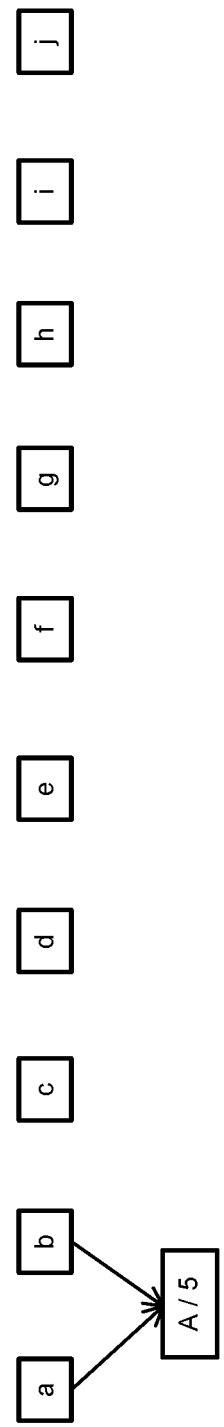
FIGS. 5-7 show a partially constructed cluster trees at respective ones of progressively lower LODs, according to an example embodiment of the present disclosure.

FIG. 5 shows an example embodiment of a partially constructed cluster tree at LOD 5. According to the LOD Table, at LOD 5, edges equal to or shorter than 10 are clustered. In the Edge Table, edge ab has a length of 8. Therefore, the vertexes of edge ab are clustered at LOD 5, which is represented in FIG. 5 by two arrows pointing vertexes a and b to cluster A at LOD 5 (represented in the figure as A/5). Further, it has to be determined whether any of the formed clusters has a length longer than the LPD for LOD 5, which is 10. Here, the longest distance covered by the cluster is 8, which is shorter than the LPD at LOD 5. Therefore, no adjustment is needed. There are no other edges which have the requisite length (i.e., d≤10). Therefore, clustering for the next LOD can take place.

Figure 6:
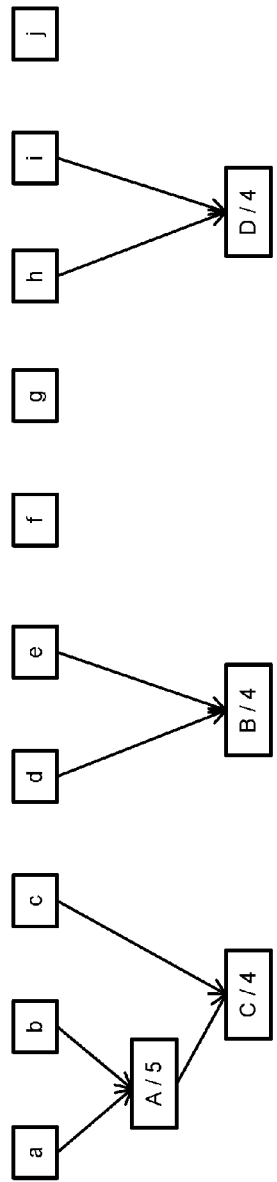

FIG. 6 shows an example embodiment of a partially constructed cluster tree, continuing with the example of FIGS. 4 and 5, at LOD 4. According to the Edge Table, at LOD 4, non-clustered edges equal to or shorter than 20 are clustered. In the Edge Table, edges de, bc, ac, and hi have the requisite length. Similar to vertexes a and b in FIG. 5, vertexes d and e, and h and i are preliminarily clustered into clusters B and D respectively. With respect to edges bc and ac, a vertex of each edge is within an already created cluster, i.e., vertexes a and b are included in cluster A. Therefore, preliminarily, cluster A and vertex c, encompassing edges ac and bc, are combined to form cluster C.

If any of the preliminarily created clusters are larger than the LPD for LOD 4, which is 20, then those clusters cannot be maintained at LOD 4. Here, each of clusters B and D has only one edge and therefore, by definition, the edge is shorter than 20 (otherwise, the edge would not have been clustered at this LOD). Cluster A encompasses three of the vertexes (a, b, and c), but each of those vertexes is closer than 20 to every other one of those vertexes. Therefore, clusters A, B, and C are final and no adjustment is needed at this LOD. As shown in FIG. 6, at LOD 5, vertexes a and b were clustered in cluster A, and at LOD 4, vertexes c, d, e, h, and i were clustered in clusters C, B, and D.

Figure 7:
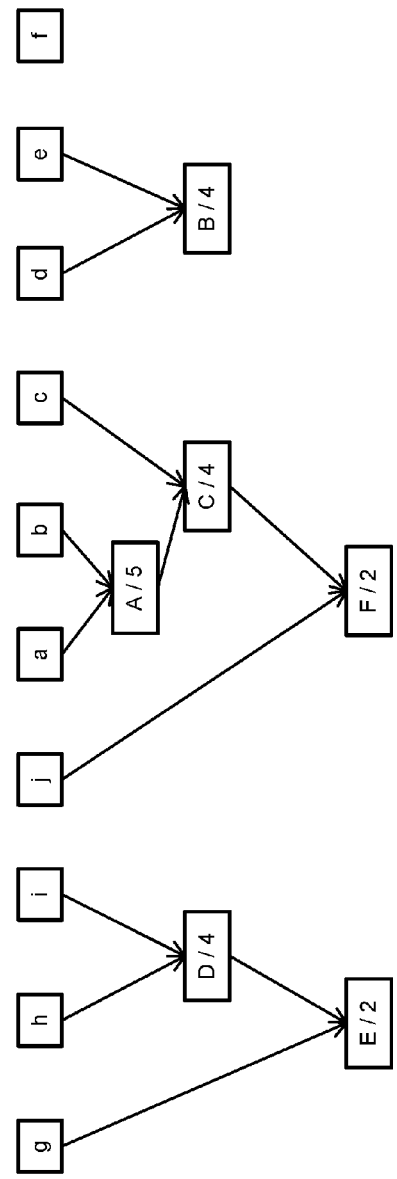

FIG. 7 continues the example, showing the partially generated cluster tree at LOD 3. According to the Edge Table, at LOD 3, edges equal to or shorter than LPD 40 are clustered. In the Edge Table, each of the edges bj, aj, and gh has the requisite length. Vertexes a and b are already included in cluster C, and therefore cluster C and vertex j are preliminarily added to cluster F at LOD 3. Similarly, vertex g is preliminarily combined with cluster D (which includes vertex h) into cluster E at LOD 3. However, cluster E includes three edges, and the length of edge gi is 45, which is longer than the LPD of 40 for LOD 3. Therefore, Cluster E is not used for a presentation generated at LOD 3, but rather is added at the next lower LOD at which the LPD is satisfied, which is LOD 2.

Similarly, in cluster F, which includes four vertexes a, b, c, and j, the distance between vertexes c and j is about 50, which is longer than the LPD of 40. Hence, cluster F is not used for a presentation at LOD 3, but rather is added at the next lower LOD at which the LPD is satisfied, which is LOD 2. Therefore, the addition of vertex j and cluster C to cluster F takes place at LOD 2.

Figure 8:
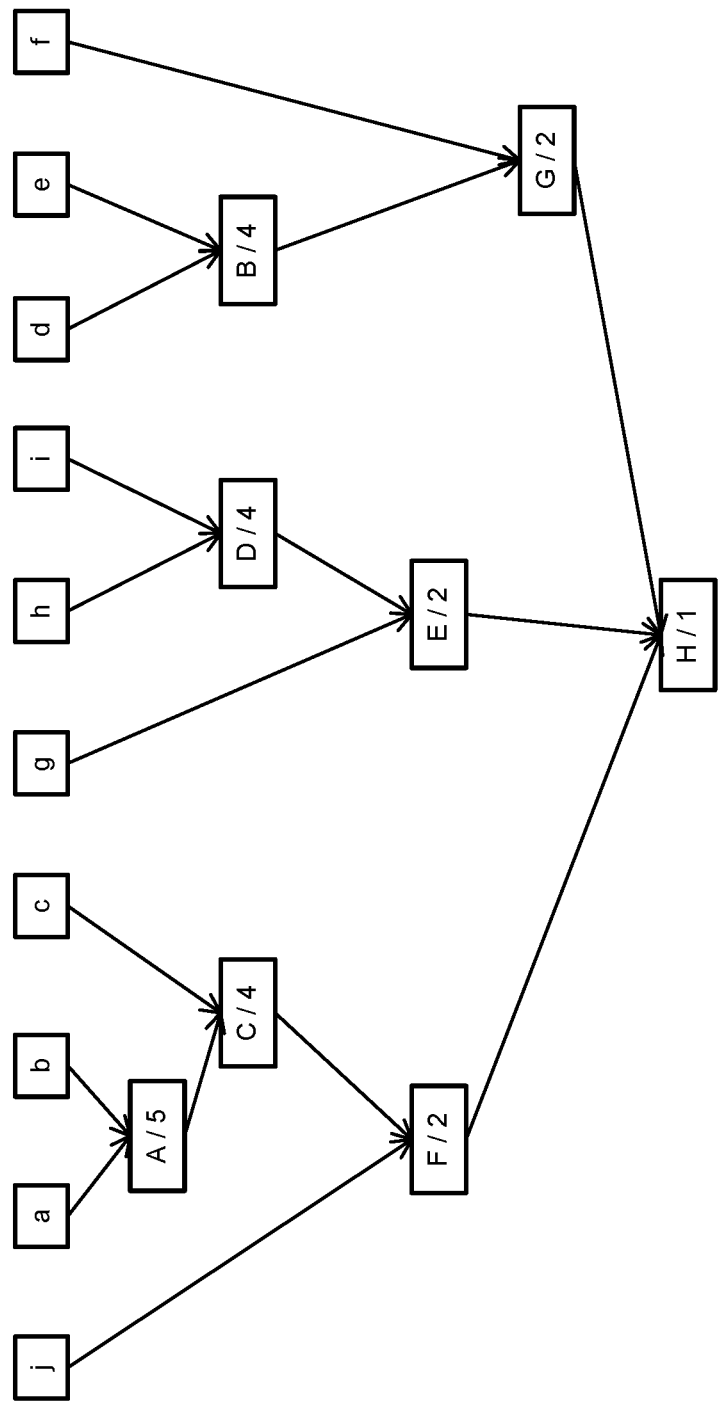
FIG. 8 shows a resulting cluster tree after performing clustering at all of the LODs, according to an example embodiment of the present disclosure.

FIG. 8 continues the example, showing the cluster tree at LOD 1 (it includes clusters generated at LOD 2 and LOD 1). According to the Edge Table, at LOD 2, edges equal to or shorter than 80 are clustered. In the Edge Table, the remaining edges, except for edge gj, have this requisite length. The first edge to consider is edge of with a length of 41. Vertex e is already included in cluster B, so that cluster B and vertex f can be preliminarily form cluster G at LOD 2. Overall, cluster G has three vertexes and the distance between each pair of the included vertexes is less than LPD 80 of LOD 2. Therefore, cluster G is final and no adjustment is needed.

The next edge on the Edge Table is edge eg, which has a length of 44. Vertex e is in cluster G, and vertex g is in cluster E, so that clustering vertexes e and g entails clustering clusters G and E into new cluster H. The distance between vertex f and vertex h (the longest separation between two vertexes in the constructed cluster) is about 103, which is longer than LPD 80 for LOD 2. Therefore, cluster H will ultimately be implemented at LOD 1.

The next edge on the Edge table is edge gi with a length of 45. The vertexes of this edge are both already included in cluster E, and therefore no further clustering is required for this edge. The next edge is edge bf, which has a length of 47. Vertex b is in cluster F, and vertex f is in cluster H, which is generated at the current LOD 2, and implemented, not at LOD 2, but rather at LOD 1. Since cluster H is generated at the current LOD, therefore the clustering of edge bf entails adding cluster F (generated at the previous LOD and including vertex b) to cluster H. Since cluster H is only implemented at LOD 1, therefore the clustering for edge bf will also only be implemented at LOD 1. The longest distance between any pair of vertexes in cluster H is about 150, which is less than LPD 160 of LOD 1, and therefore cluster H can be implemented at LOD 1 (and there is no need for further clustering at any lower LOD).

Although cluster F is initially added to cluster H, in an example embodiment, the system performs backtracking, according to which, because cluster H is an already existing cluster generated in the current LOD 2 prior to performing clustering for edge bf and the size of constructed cluster H does not exceed the LPD of 160, it is determined whether cluster F (including vertex b) can be backtracked, i.e., placed under another cluster which includes vertex f and which was clustered into cluster H. The only other cluster that is clustered into cluster H and that includes vertex f is cluster G. However, the size of the constructed cluster G would increase over the LPD for LOD 2 at which cluster G is implemented, and therefore cluster F remains at cluster H.

At this point, even though all of the vertexes have been clustered and a complete cluster tree has been shaped (i.e., all of the vertexes belong to a parent cluster H), clustering is not concluded because one has to cluster the remaining edges. In this example, however, the only remaining edge is edge gj, and the clustering for edge gj does not modify the already constructed tree, because vertexes g and j are already clustered into cluster H. Therefore, the cluster tree for the set of locational information items of FIG. 3 is complete.

FIGS. 3 and 9-12 show a map including several locational information items clustered at various LODs. For a given display size of a computing device, the scope of the map (i.e., area covered) shown in the display for a given LOD quadruples at the next lower LOD. However, all of FIGS. 3 and 9-12 have the same scope (i.e., covering the same exact area). Thus, it has to be noted that FIGS. 3 and 9-12 only display how the locational information items are clustered, and FIGS. 3 and 9-12 do not represent the accurate scope of the map for a given LOD at a given display size.

FIG. 3 corresponds to LOD 6 of the LOD Table and the Edge Table. Since there are no clusters at LOD 6, each vertex is represented separately. In other words, a display of this map at LOD 6 does not include any clustered locational information items.

Figure 9:
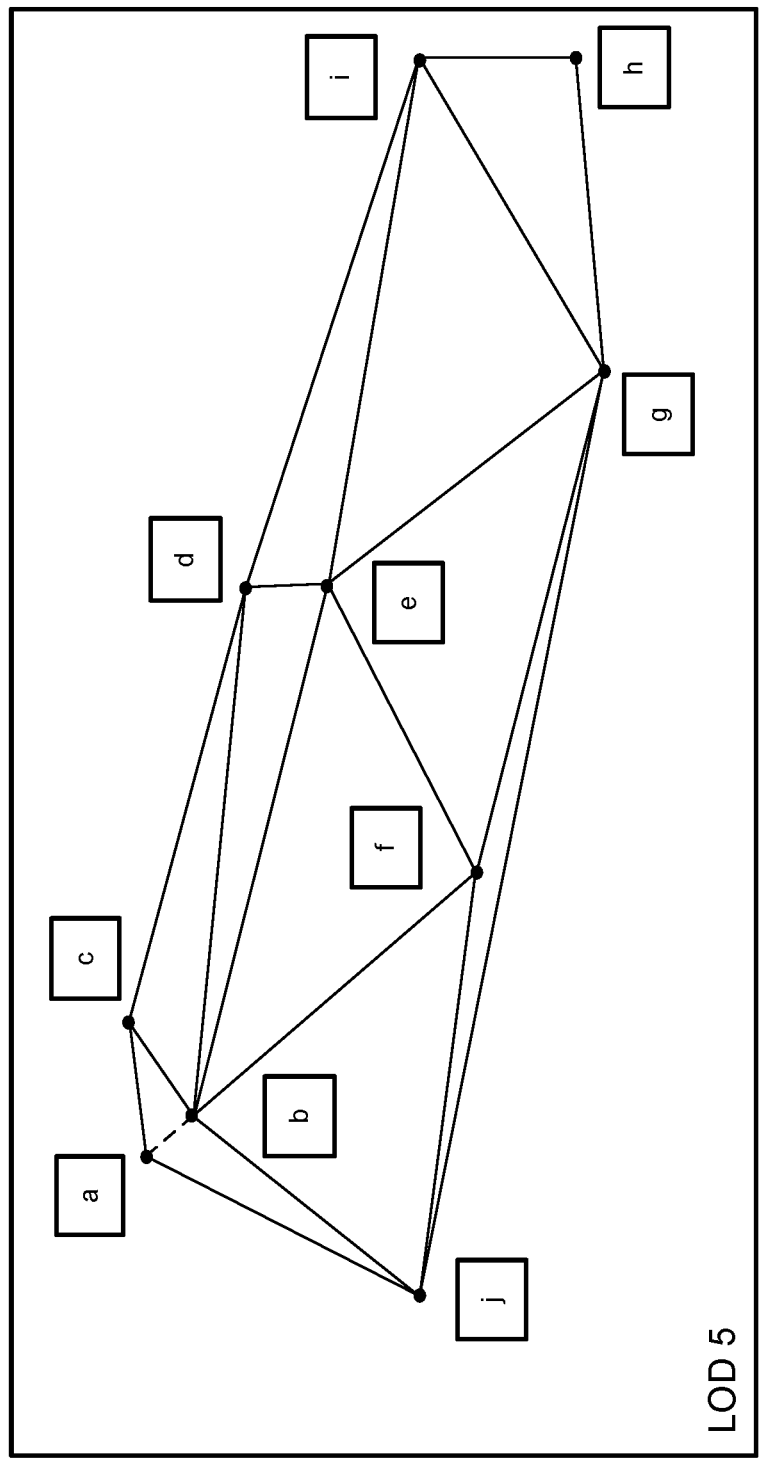
FIGS. 9-12 show a map including several locational information items clustered at various LODs, according to an example embodiment of the present disclosure.

FIG. 9 corresponds to LOD 5 of the LOD Table and the Edge Table. According to FIG. 5, at LOD 5, only the vertexes a and b are clustered into cluster A. As a result, in FIG. 9, edge ab is dashed, indicating that both vertexes a and b are clustered. When represented on a map at LOD 5, vertexes a and b are represented together as a single graphical component; however, the remaining vertexes are represented separately.

Figure 10:
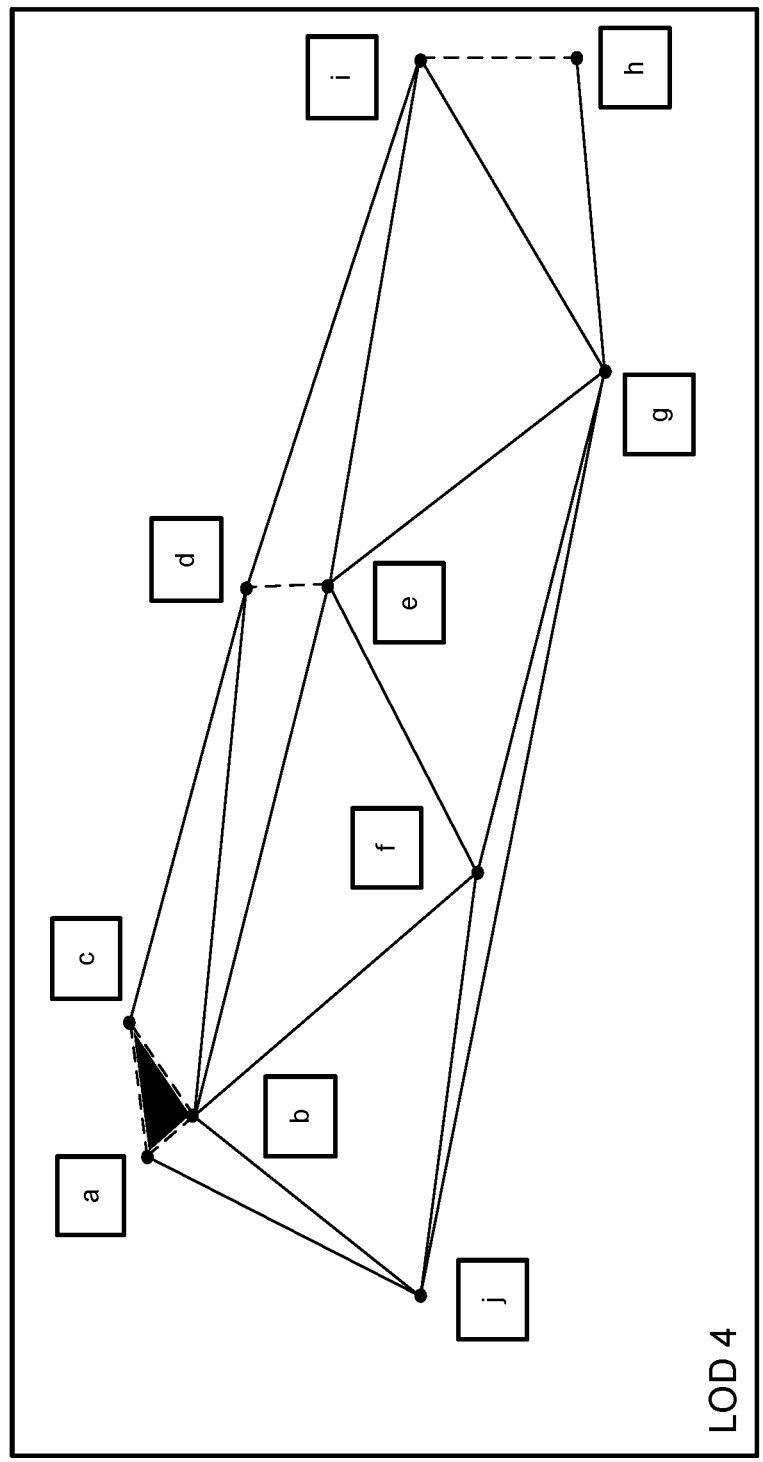

FIG. 10 corresponds to LOD 4 of the LOD Table and the Edge Table. According to FIG. 6, at LOD 4, cluster A and vertex c are clustered into cluster C; vertexes d and e are clustered into cluster B; and vertexes h and i are clustered into cluster D. These clusters are shown in FIG. 10. Accordingly, cluster C, which includes vertexes a, b, and c is shown by a black triangle between vertexes a, b, and c. Cluster B is represented by a dashed line between the vertexes d and e. Similarly, cluster D is represented by a dashed line between vertexes h and i. In a map at LOD 4, vertexes a, b, and c are represented together by a single graphical component; vertexes d and e are represented together by a single graphical component; and vertexes h and i are represented together by a single graphical component; however, since there are no other clusters at LOD 4, the outstanding vertexes (i.e., f, g, and j) can be represented separately.

Figure 11:
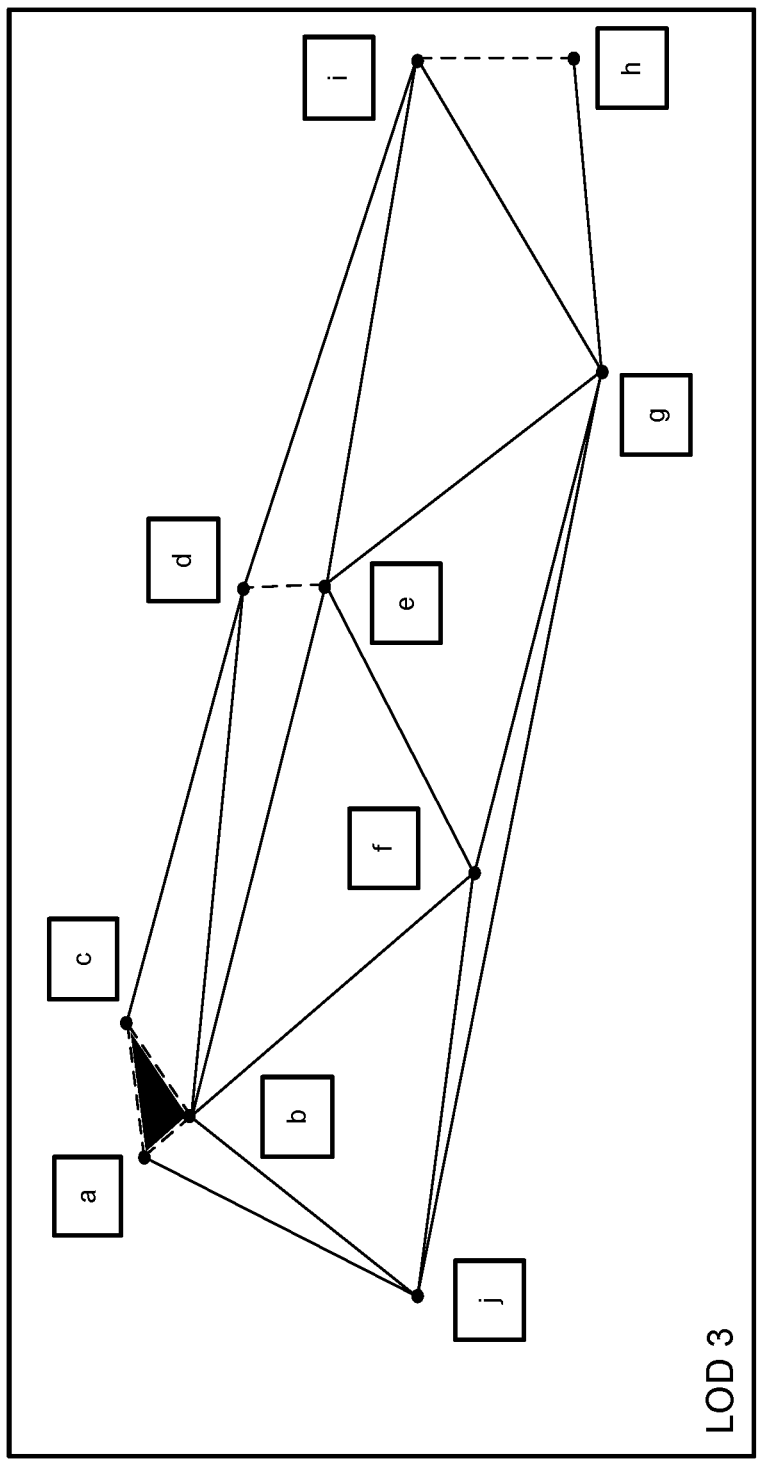

FIG. 11 corresponds to LOD 3 of the LOD Table and the Edge Table. According to FIG. 7, no clusters have been created at LOD 3. Therefore, the display of this LOD on the map is the same as LOD 4.

Figure 12:
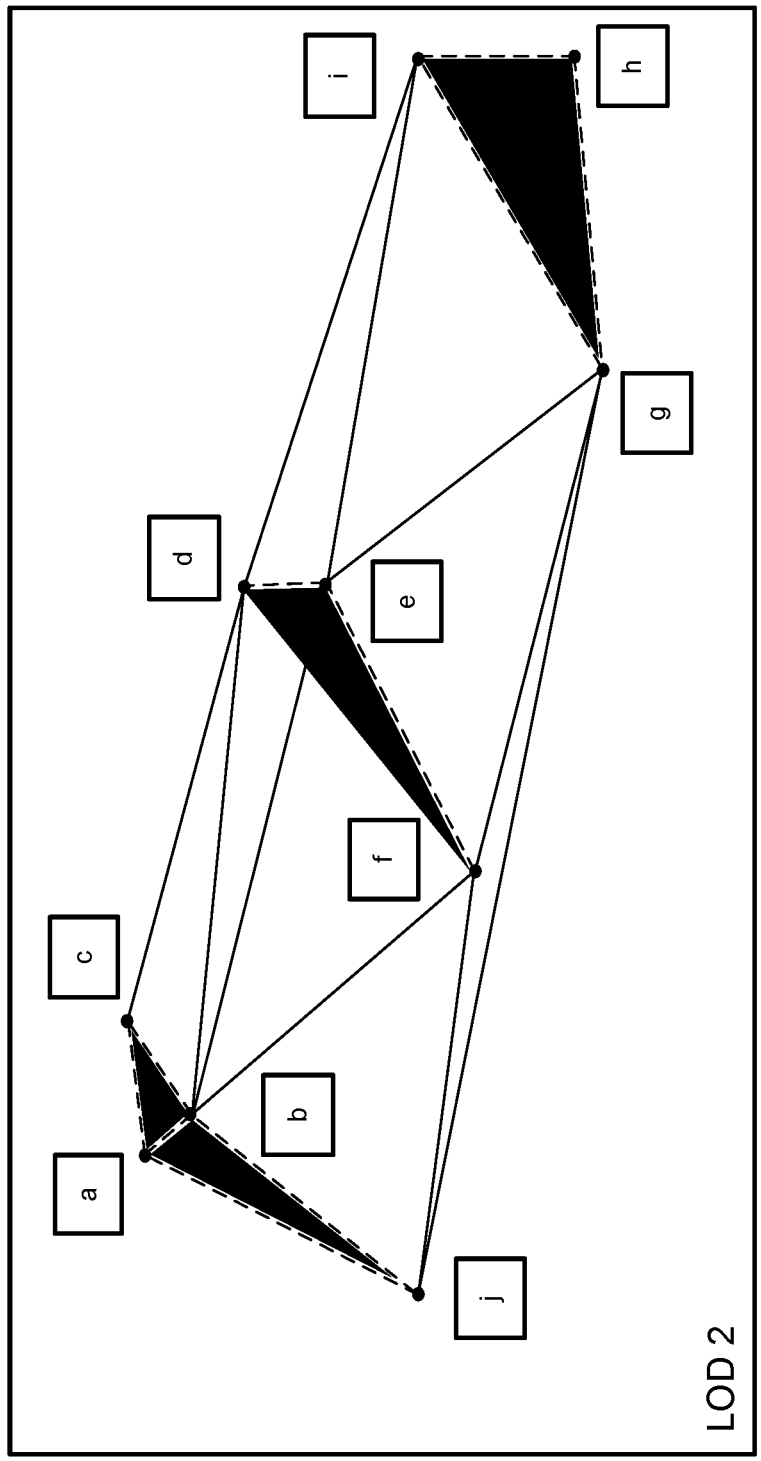

FIG. 12 corresponds to LOD 2 of the LOD Table and the Edge Table. According to FIG. 8, at LOD 2, cluster D and vertex g are clustered into cluster E; cluster C and vertex j are clustered into cluster F; and cluster B and vertex f are clustered into cluster G. As a result, in FIG. 12, cluster D, which was a dashed line between vertexes h and i, is expanded into a triangle to include vertex g; cluster B, which was a dashed line between vertexes d and e, is expanded into a triangle to include vertex f; and cluster C is expanded to incorporate vertex j and create a quadrilateral, which represents cluster F. No other clusters have been created at LOD 2 and there are no other vertexes which do not belong to a cluster. A map representing LOD 2 includes three clusters, and can represent vertexes a, b, c, and j together by a single graphical component; vertexes d, e, and f together by a single graphical component; and vertexes g, h, and i together by a single graphical component.

Finally, a map at LOD 1 (not illustrated in the figures), can represent vertexes a-j clustered together by a single graphical component, with no outstanding vertexes to be clustered.

In the example embodiments of FIGS. 3 and 9-12, each cluster was assigned an area between the points included in the cluster. However, there are various ways to assign an area to a cluster. In an example embodiment, a Voronoi diagram over the initial set of locational information items (i.e., vertexes) can be created. A product of the Voronoi diagram is a partitioning of the plane into various regions, each of which is assigned to a vertex. By using a Voronoi diagram, each vertex is assigned to a distinct region, and the entire plane is divided into regions so that the sum of the areas of the regions is equal to the area of the plane. Since every vertex is assigned to a region, an area of a cluster can be constructed by adding the areas of the regions of the vertexes included in the cluster. Therefore, in visual representation of the cluster, the cluster is represented by the regions of its vertexes. By using a Voronoi diagram and clustering, as described above, the area of the map can be divided into clusters which do not overlap and at the same time cover all of the map.

In the example embodiment according to FIG. 3, the LOD Table and the Edge Table, there are no locational information items with identical coordinate values. However, it is conceivable that in a mapping application, there are situations in which multiple locational information items have identical coordinate values. For clustering purposes, in an example embodiment, the system is configured to consider only one of such locational information items and exclude the remaining informational items. Subsequently, after the cluster tree is generated, the system can add back such locational information items to the cluster tree.

Figure 13:
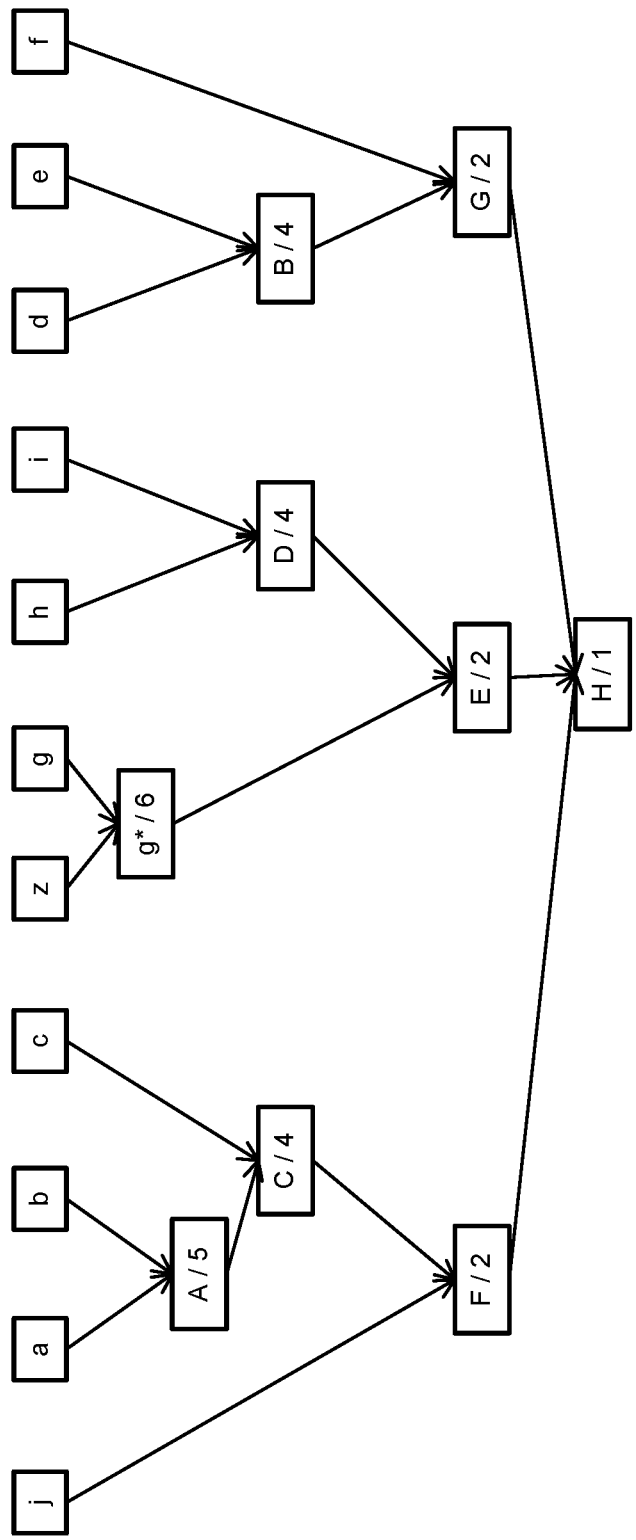
FIG. 13 shows a cluster tree including locational information items with identical coordinate values, according to an example embodiment of the present disclosure.

FIG. 13 shows an example embodiment of a cluster tree including locational information items with identical coordinate values. In FIG. 13, locational information items g and z include identical coordinate values. As described before, for the purpose of creating a Delaunay Triangulation, all but one of the identical items was excluded. Hence, after clustering other locational information items (i.e., a-j), one has to add back identical locational information items (here, z). In order to do so, the system treats items g and z as though there is an edge between them. Since the vertexes have the same coordinate values, the length of the edge is zero. Therefore, vertexes g and z can be clustered, and by definition, this clustering takes place at the highest LOD. In this example embodiment, vertexes g and z were clustered at LOD 6. The name of this cluster is g*. Since points g and z are clustered at the highest LOD available, vertexes g and z will be clustered in every representation of the mapping application.

In another example embodiment, clustering identical points can take place at the highest LOD before constructing the cluster tree. As a result, the cluster tree includes identical points throughout the process of building the cluster tree and no adding back is needed at the end of the process.

Figure 14:
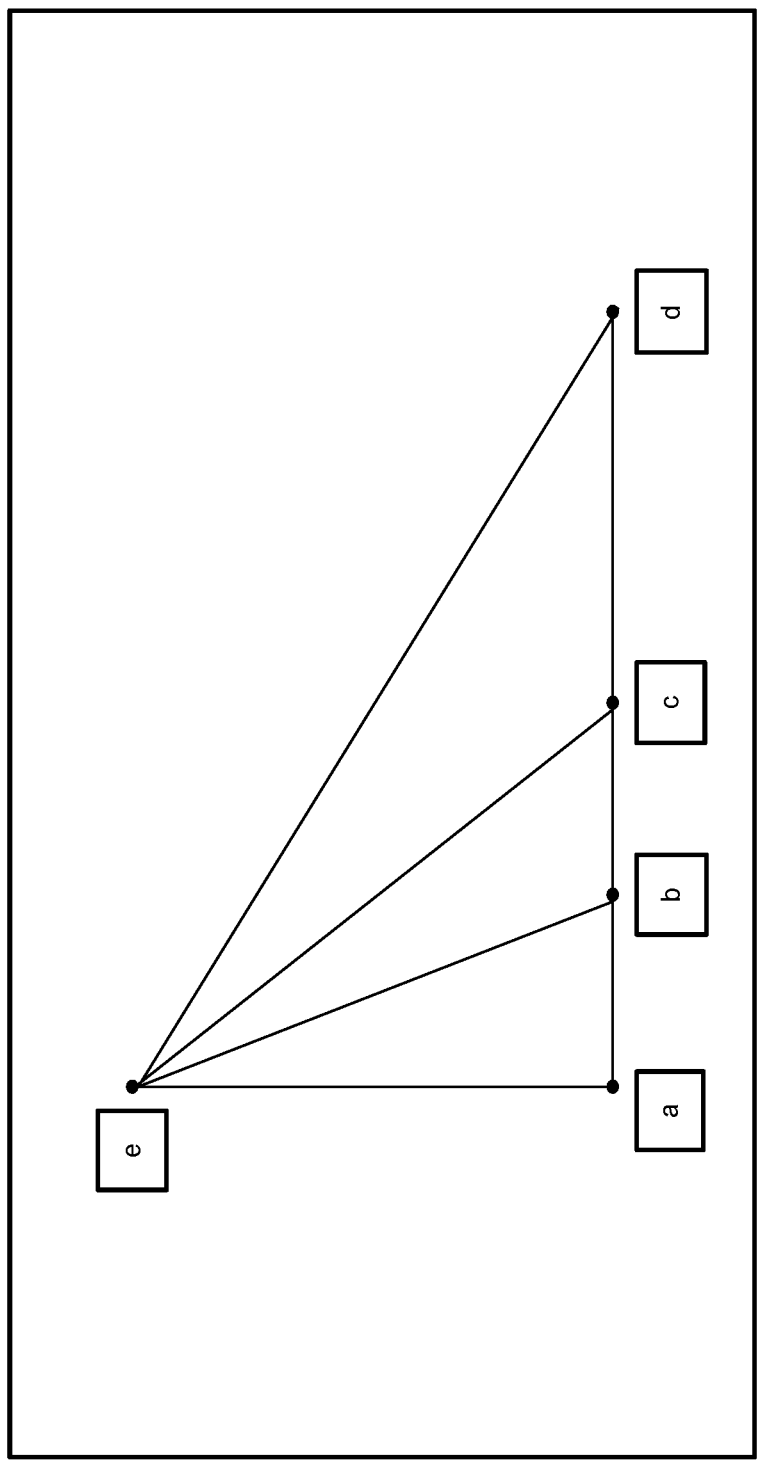
FIG. 14 shows a set of locational information items which are triangulated according to an example embodiment of the present disclosure.

FIG. 14 shows a set of locational information items which are triangulated according to an example embodiment of the present disclosure. The triangulation provides for the edge table (the "Edge Table 2") identified below. In this example embodiment, a cluster tree can be constructed based on the LOD table (the "LOD Table 2") identified below.

| Row | $V_1$ | $V_2$ | Edge | d |
|---|---|---|---|---|
| 1 | a | b | ab | 2 |
| 2 | b | c | bc | 2 |
| 3 | c | d | cd | 4 |
| 4 | a | e | ae | 5 |
| 5 | b | e | be | 5.38 |
| 6 | c | e | ce | 6.40 |
| 7 | d | e | de | 9.43 |

| LOD | LPD |
|---|---|
| 2 | 13 |
| 3 | 6.5 |
| 4 | 3.25 |

Figure 15:
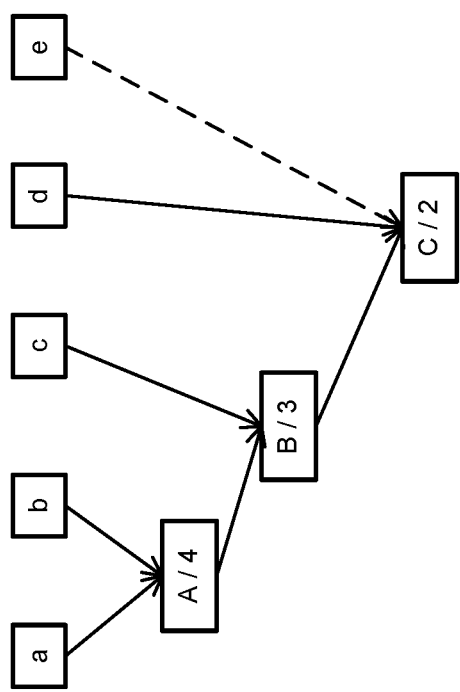
FIGS. 15 and 16 show a partially constructed cluster tree including various LODs, and illustrating backtracking, according to an example embodiment of the present disclosure.

FIG. 15 shows an example embodiment of a partially constructed cluster tree generated over a plurality of LODs. Backtracking is described with respect to the example shown in FIG. 15. Edge ab is clustered into cluster A at LOD 4. Edge bc is clustered at LOD 3, because addition of vertex c to cluster A would increase the size of cluster A to 4 (by virtue of the distance between vertexes a and c) which is more than the LPD of 3.25 for LOD 4. Thus, vertex c is added to cluster B at LOD 3. Similarly, edge cd cannot be added to cluster B, because addition of vertex d to cluster B would increase the size of cluster B to 8, which is more than the LPD of 6.5 for LOD 3. Hence, cluster B and vertex d are added to cluster C at LOD 2.

The next edge to be clustered is edge ae, which has a length of 5. Vertex e can be added to cluster C at LOD 2. The size of cluster C does not exceed the LPD of 13 for LOD 2. Addition of vertex e to cluster C, however, is addition of a vertex to a previously generated cluster. Therefore, it has to be determined whether vertex e can be backtracked, i.e., whether vertex e can be added to another cluster including vertex a and that has been clustered into cluster C. The highest cluster to which vertex e can be added is cluster B at LOD 3. In the constructed cluster B including vertex e, the longest distance between two vertexes belongs to vertexes e and c, which is 6.40 and is less than the LPD of 6.5 for LOD 3. Addition of vertex e to cluster A would enlarge the size of cluster A beyond the LPD for LOD 4 at which cluster A was generated, and therefore vertex e cannot be added to that cluster.

Figure 16:
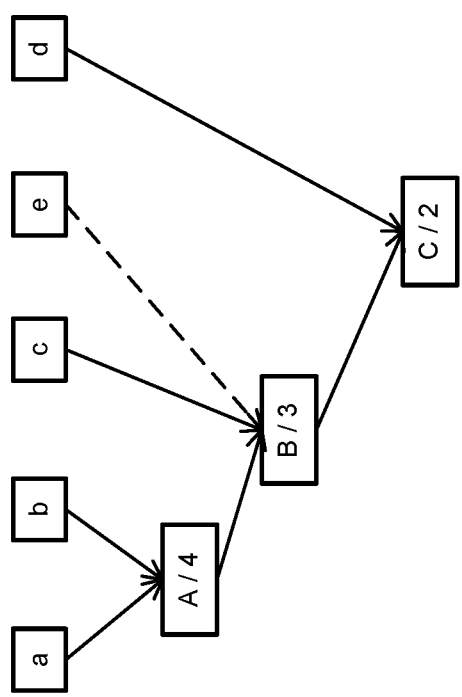

FIG. 16 shows the tree after vertex e is moved to cluster B of LOD 3.

An example embodiment of the present disclosure is directed to one or more processors, which can be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, smart watch, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present disclosure is directed to one or more hardware computer-readable media, e.g., as described above, having stored thereon instructions executable by a processor to perform the methods described herein.

An example embodiment of the present disclosure is directed to a method, e.g., of a hardware component or machine, of transmitting instructions executable by a processor to perform the methods described herein.

An example embodiment of the present disclosure is directed to a computer to user graphical user interface, in which maps are displayed at various levels of detail according to interaction by the user with the maps, where the clustering of informational items into representative graphical components at respective ones of the levels of detail are determined according to the clustering methods described above.

The above description is intended to be illustrative, and not restrictive, and although the above description provides details for purposes of clarity of understanding, it will be apparent that certain changes and modifications may be practiced within the scope of the following claims. The invention is not to be limited to the details given herein, but may be modified within the scope and equivalents of the following claims. For example, those skilled in the art can appreciate from the foregoing description that the present disclosure may be implemented in a variety of forms, and that the various embodiments may be implemented alone or in combination. Therefore, while the embodiments of the present disclosure have been described in connection with particular examples thereof, the true scope of the embodiments and/or methods of the present disclosure should not be so limited since other modifications will become apparent to the skilled practitioner upon a study of the drawings, specification, and following claims. For example, the present disclosure may be practiced according to the claims without some or all of these specific details. For the purpose of clarity, technical material that is known in the technical fields related to the invention has not been described in detail so that the present disclosure is not unnecessarily obscured.

What is claimed is:

1. A method for clustering, by processing circuitry, at a plurality of levels of detail at which a map is provided in a user interactive display of an output device according to user interaction with the user interactive display, the method comprising:
   storing, in an electronically accessible storage device, a plurality of items, each item including a set of coordinate values indicating a location on the map;
   triangulating, by the processing circuitry, the plurality of items, thereby defining edges between a plurality of pairs of the plurality of items;
   calculating, by the processing circuitry, a length of each edge of the edges;
   sorting, by the processing circuitry, the edges by length;
   creating, by the processing circuitry, a cluster tree including the plurality of items, wherein the creating of the cluster tree includes clustering the plurality of items into a hierarchical arrangement of clusters, with different sets of the clusters corresponding to different levels of detail, and each of at least one of the clusters having clustered into the respective cluster another one of clusters generated for a higher level of detail than the respective cluster; and
   responsive to user interaction with the user interactive display to change a zoom level of the map, modifying, by the processing circuitry, a level of detail of the map displayed in the user interactive display, the modifying including changing a set of graphical components displayed in the user interactive display to include more of the graphical components when zooming in and less of the graphical components when zooming out, wherein each of the graphical components represents one or more of the plurality of items according to clusters of the cluster tree corresponding to the level of detail to which the map is modified;
   wherein:
   the cluster tree is created progressively, beginning at a first of the levels of detail and progressing towards a last of the levels of detail, in order of their levels of detail, and, at each of the levels of detail, the creating of the cluster tree includes, for each of the edges that have not yet been clustered and that have a length shorter than a longest permissible distance (LPD) predefined for the respective level of detail, adding a first item of the edge to a cluster including a second item of the edge;
   the creating of the cluster tree further comprises checking whether a size of the cluster is smaller than the LPD for the current level of detail, when the first item is added to the cluster.

2. The method of claim 1, wherein the triangulation is a Delaunay Triangulation.

3. The method of claim 1, wherein the length of each edge is calculated according to the set of coordinate values of the pair of items between which the edge extends.

4. The method of claim 1, wherein, in the creating of the cluster tree, if adding the first item to a cluster at a level of detail increases the size of the cluster to a size larger than the LPD for the respective level of detail, the first item is not added to the cluster, and is instead added to a cluster at a next lower level of detail at which the addition of the first item to the cluster does not caused exceedance of the LPD of the respective level of detail.

5. The method of claim 4, wherein the creating of the cluster tree includes executing an algorithm that defines that, when the first item is, in order to cluster the first item with a first other item, initially added to a cluster that already includes the first other item and a second other item, and that that includes another cluster, the first item is moved to be clustered into the other cluster if (a) the other cluster includes the first other item and (b) the inclusion of the first item into the other cluster does not cause the other cluster to increase to a size greater than an LPD defined for the level of detail for which the other cluster was previously generated.

6. A device for clustering at a plurality of levels of detail at which a map is provided, the device comprising:
   a processing circuitry configured to:
      store, in an electronically accessible storage device, a plurality of items, each item including a set of coordinate values indicating a location on the map;
      triangulate the plurality of items, thereby defining edges between a plurality of pairs of the plurality of items;
      calculate a length of each edge of the edges;
      sort the edges by length;
      create a cluster tree including the plurality of items, wherein the creating of the cluster tree includes clustering the plurality of items into a hierarchical arrangement of clusters, with different sets of the clusters corresponding to different levels of detail, and each of at least one of the clusters having clustered into the respective cluster another one of clusters generated for a higher level of detail than the respective cluster; and
   an output device including a user interactive display configured to:
      responsive to user interaction with the user interactive display to change a zoom level of the map, modify a level of detail of the map displayed in the user interactive display, the modifying including changing a set of graphical components displayed in the user interactive display to include more of the graphical components when zooming in and less of the graphical components when zooming out, wherein each of the graphical components represents one or more of the plurality of items according to clusters of the cluster tree corresponding to the level of detail to which the map is modified;

wherein:
the cluster tree is created progressively, beginning at a first of the levels of detail and progressing towards a last of the levels of detail, in order of their levels of detail, and, at each of the levels of detail, the creating of the cluster tree includes, for each of the edges that have not yet been clustered and that have a length shorter than a longest permissible distance (LPD) predefined for the respective level of detail, adding a first item of the edge to a cluster including a second item of the edge;

the creating of the cluster tree further comprises checking whether a size of the cluster is smaller than the LPD for the current level of detail, when the first item is added to the cluster.

7. The device of claim 6, wherein the triangulation is a Delaunay Triangulation.

8. The device of claim 6, wherein the length of each edge is calculated according to the set of coordinate values of the pair of items between which the edge extends.

9. The device of claim 6, wherein, in the creating of the cluster tree, if adding the first item to a cluster at a level of detail increases the size of the cluster to a size larger than the LPD for the respective level of detail, the first item is not added to the cluster, and is instead added to a cluster at a next lower level of detail at which the addition of the first item to the cluster does not caused exceedance of the LPD of the respective level of detail.

10. The device of claim 6, wherein the creating of the cluster tree includes executing an algorithm that defines that, when the first item is, in order to cluster the first item with a first other item, initially added to a cluster that already includes the first other item and a second other item, and that that includes another cluster, the first item is moved to be clustered into the other cluster if (a) the other cluster includes the first other item and (b) the inclusion of the first item into the other cluster does not cause the other cluster to increase to a size greater than an LPD defined for the level of detail for which the other cluster was previously generated.

11. A non-transitory computer-readable data storage medium storing a computer program code which, when executed on a computer, implement a method for clustering, by processing circuitry, at a plurality of levels of detail at which a map is provided in a user interactive display of an output device according to user interaction with the user interactive display, the method comprising:

storing, in an electronically accessible storage device, a plurality of items, each item including a set of coordinate values indicating a location on the map;

triangulating, by the processing circuitry, the plurality of items, thereby defining edges between a plurality of pairs of the plurality of items;

calculating, by the processing circuitry, a length of each edge of the edges;

sorting, by the processing circuitry, the edges by length;

creating, by the processing circuitry, a cluster tree including the plurality of items, wherein the creating of the cluster tree includes clustering the plurality of items into a hierarchical arrangement of clusters, with different sets of the clusters corresponding to different levels of detail, and each of at least one of the clusters having clustered into the respective cluster another one of clusters generated for a higher level of detail than the respective cluster; and responsive to user interaction with the user interactive display to change a zoom level of the map, modifying, by the processing circuitry, a level of detail of the map displayed in the user interactive display, the modifying including changing a set of graphical components displayed in the user interactive display to include more of the graphical components when zooming in and less of the graphical components when zooming out, wherein each of the graphical components represents one or more of the plurality of items according to clusters of the cluster tree corresponding to the level of detail to which the map is modified;

wherein:
the cluster tree is created progressively, beginning at a first of the levels of detail and progressing towards a last of the levels of detail, in order of their levels of detail, and, at each of the levels of detail, the creating of the cluster tree includes, for each of the edges that have not yet been clustered and that have a length shorter than a longest permissible distance (LPD) predefined for the respective level of detail, adding a first item of the edge to a cluster including a second item of the edge;

the creating of the cluster tree further comprises checking whether a size of the cluster is smaller than the LPD for the current level of detail, when the first item is added to the cluster.

12. The computer-readable data storage medium of claim 11, wherein the triangulation is a Delaunay Triangulation.

13. The computer-readable data storage medium of claim 11, wherein the length of each edge is calculated according to the set of coordinate values of the pair of items between which the edge extends.

14. The computer-readable data storage medium of claim 11, wherein, in the creating of the cluster tree, if adding the first item to a cluster at a level of detail increases the size of the cluster to a size larger than the LPD for the respective level of detail, the first item is not added to the cluster, and is instead added to a cluster at a next lower level of detail at which the addition of the first item to the cluster does not caused exceedance of the LPD of the respective level of detail.

15. The computer-readable data storage medium of claim 11, wherein the creating of the cluster tree includes executing an algorithm that defines that, when the first item is, in order to cluster the first item with a first other item, initially added to a cluster that already includes the first other item and a second other item, and that that includes another cluster, the first item is moved to be clustered into the other cluster if (a) the other cluster includes the first other item and (b) the inclusion of the first item into the other cluster does not cause the other cluster to increase to a size greater than an LPD defined for the level of detail for which the other cluster was previously generated.

* * * * *